United States Patent
Anvari

(10) Patent No.: US 8,947,195 B1
(45) Date of Patent: *Feb. 3, 2015

(54) HELMET IMPACT DETECTION AND PREVENTION MECHANISM TO MINIMIZE HEAD CONCUSSION

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/694,969

(22) Filed: Jan. 10, 2013

(51) Int. Cl.
  *G05B 23/02* (2006.01)
  *A42B 3/04* (2006.01)
  *G05B 13/02* (2006.01)

(52) U.S. Cl.
  CPC .. *A42B 3/04* (2013.01); *G05B 13/02* (2013.01)
  USPC .......................................................... 340/3.1

(58) Field of Classification Search
  CPC .............................. G01F 15/024; G01S 15/18
  USPC ............. 340/3.1, 10.5, 4.1; 702/41, 141, 142; 73/1.79
  See application file for complete search history.

(56) References Cited

U.S. PATENT DOCUMENTS

| 5,287,562 A * | 2/1994 | Rush, III ........................... 2/413 |
| 5,390,367 A * | 2/1995 | Rush, III ........................... 2/462 |
| 7,693,668 B2 * | 4/2010 | Vock et al. ....................... 702/44 |

* cited by examiner

*Primary Examiner* — Vernal Brown

(57) ABSTRACT

A helmet with wireless sensor system for monitoring of surrounding objects. The helmet with wireless sensor system comprises a number of wireless transceiver to transmit a particular signal and receive reflected signals from surrounding objects; a processing unit that uses the information from reflected signal received by wireless transceiver to calculate the speed, distance, and direction of the object to determine when and where an impact will occur; and a number of inflatable/deflatable pads installed on the helmet and external to the helmet that will be activated prior to an impact.

10 Claims, 3 Drawing Sheets

HELMET IMPACT DETECTION AND PREVENTION MECHANISM TO MINIMIZE HEAD CONCUSSION

BACKGROUND

A concussion is an injury to the brain. The brain does not work right for a while after a concussion. One may have problems with things like memory, balance, concentration, judgment, and coordination. The brain will need time to heal after a concussion. Most will have a full recovery with the proper rest and monitoring.

A concussion is caused by a sudden, violent jolt to the brain. It may be caused by:
A blow to the head
Severe jarring or shaking—like a bad fall
Abruptly coming to a stop—most common in car accidents
Concussions most often occur with events that involve:
  Motor vehicles
  Bicycles
  Skates, skateboards, and scooters
  Sports and recreation
  Falling down
  Firearms
  Physical violence such as
  Assault and battery
  Domestic violence
  Child abuse Traumatic brain injury or concussions occur when the head sustains a blunt and powerful force. Though typically it is not the impact or bruising that causes the neurotrauma. It is the rapid motion of the head. When the head is spun violently or sent into a state of rapid acceleration followed by an abrupt stop, brain neuron functions are disrupted. In CTE (Chronic traumatic encephalopathy), this disruption has caused "Tau" proteins—structures commonly found in neurons—to progressively amass to toxic levels and form tangled structures within the brain. As a result, electrical signaling between neurons is diminished and the brain's ability to process and retain information becomes increasingly impaired. Emotional disorders such as dementia and depression may also ensue.

Historically, research on TBI (Traumatic Brain Injury) and CTE has focused on amateur and professional athletes. Initially diagnosed in boxers who had sustained multiple concussions in the ring, CTE is commonly associated with contact sports such as football, wrestling and ice hockey (in addition to boxing). Now, however, researchers are making a similar association between blast neurotrauma and CTE in U.S. military veterans who have served in war.

Over the last few years, safety concerns regarding football helmets and concussions have become a most pressing issue. Safety issues in football are now ubiquitous, ranging from increased safety measures in the NFL to academics rating the best football helmets. And now legislation is spreading across America aimed at treating student-athletes with concussions.

Football helmet manufacturers are very aware of this, which is why they have created the most innovative and advanced helmets the sport has ever seen. Helmets have radically transformed over the last 10 years into engineering marvels.

The drive to minimize head injuries in sports is stronger than ever, especially in football. The NFL, recognizing the importance, has put stricter player-safety rules and policies in place—but technology is catching up to offer preventive methods to combat the issue.

As described above, traumatic brain injury or concussions occur when the head sustains a blunt and powerful force that results in violent spun of the head or sending the head into a state of rapid acceleration followed by an abrupt stop. When this happen brain neuron functions are disrupted. Helmets are useful as safety gear to prevent brain injuries in an uncontrolled environment. If one can't prevent a crash or impact, but knows it will occur, a helmet can prevent or minimize injury to the head and brain. No helmet can protect against all possible impacts, and the impact may exceed the helmet's protection. No helmet protects any part of the body that it does not cover, so even if the head injury is minimized one may have a smashed face, broken bones or worse.

Standards define laboratory tests for helmets are matched to the use intended. If a helmet can pass the tests for a sport or activity, it provides adequate impact protection. A construction helmet will not pass the more severe bicycle helmet tests. A bicycle helmet will not pass the more severe motorcycle helmet tests. None of them provides the protection against shrapnel that is required of a military helmet. Standards also define other tests for such parameters as strap strength, shell configuration, visor attachments, and the head coverage that must be provided, depending on the activity.

Helmets designed to handle major crash energy generally contain a layer of absorbable pad. When one crashes and hit a hard object, the pad part of a helmet crushes, controlling the crash energy and extending the head's stopping time by about few thousandths of a second to reduce the peak impact to the brain. Rotational forces and internal strains are likely to be reduced by the crushing.

Thicker pad is better, giving the head more room and milliseconds to stop. If the pad is 15 mm thick it obviously has to stop you in half the distance of a 30 mm thick pad. Basic laws of physics result in more force to the brain if the stopping distance is shorter, whatever the "miracle" pad may be. Less dense pad can be better as well, since it can crush in a lesser impact, but it has to be thicker in order to avoid crushing down and "bottoming out" in a harder impact. The ideal "rate sensitive" pad would tune itself for the impact, stiffening up for a hard one and yielding more in a more moderate hit.

If the helmet is very thick, the outer circumference of the head is in effect extended. If the helmet then does not skid on the crash surface, that will wrench the head more, contributing to strain on the neck and possibly to rotational forces on the brain. In short, there are always tradeoffs, and a super-thick helmet will probably not be optimal. It will also fail on consumer acceptance.

If there are squishy fitting pads inside the helmet they are there for comfort, not impact. The impact is so hard and sharp that squishy pad just bottoms out immediately. In most helmets a smooth plastic skin holds the helmet's pad together as it crushes and helps it skid easily on the crash surface, rather than jerking your head to a stop. In activities that involve forward speed on rough pavement, rounder helmets are safer; since they skid more easily. The straps keep the helmet on the head during the crash sequence. A helmet must fit well and be level on the head for the whole head to remain covered after that first impact.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
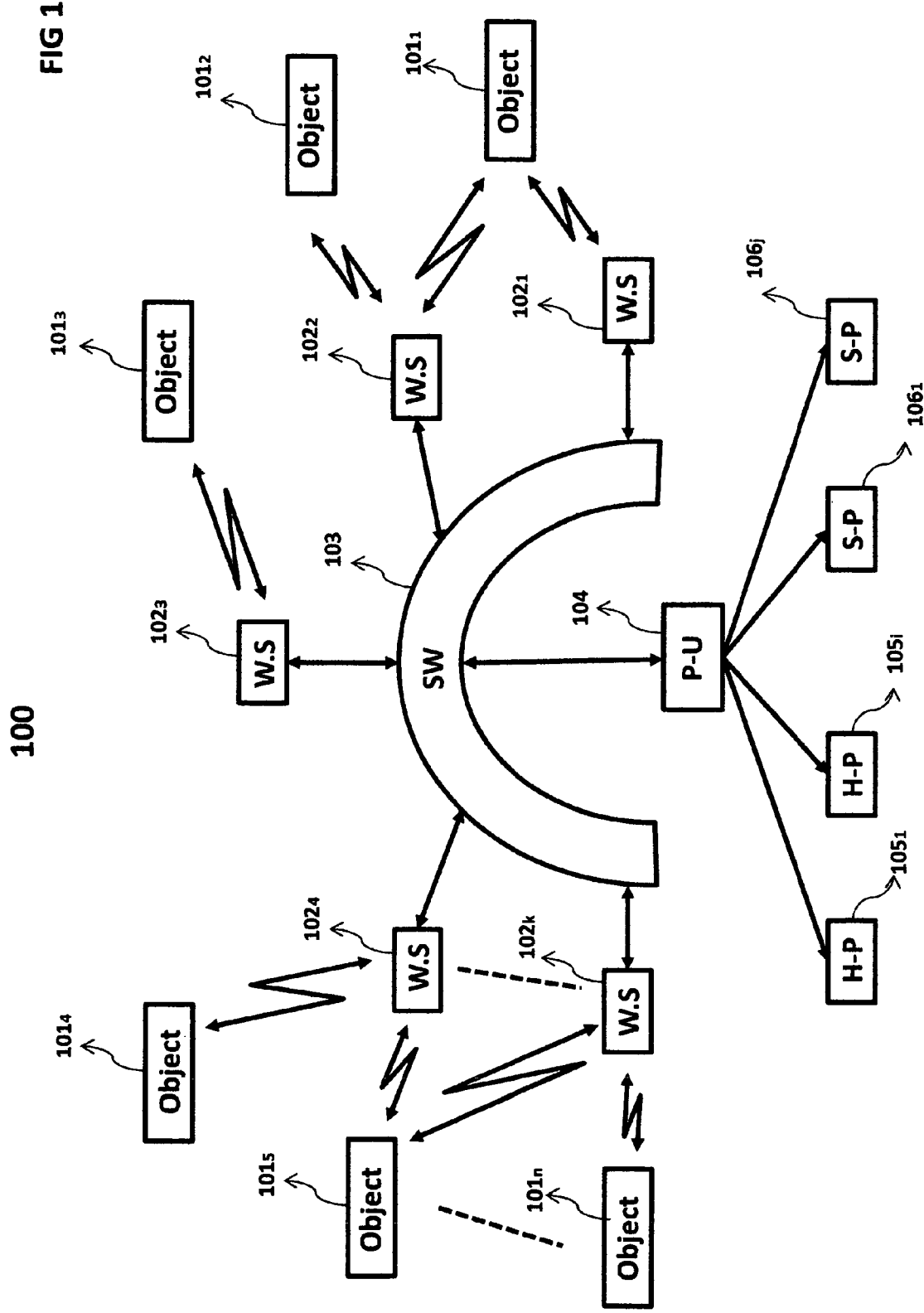
FIG. 1 illustrates an embodiment of a wireless sensing system.

FIG. 1 depicts an embodiment of wireless sensing system 100. In general, wireless sensing system 100 facilitates in the providing of information, to a processing unit (P-U) 104, from wireless sensors (W.S) $102_1$-$102_k$ through a switch (SW) 103. For example, processing unit 104 requests information from the wireless sensors $102_1$-$102_k$ through the switch 103. In response to the request, wireless sensor $102_1$-$102_k$ provides the requested information to the processing unit 104 via wireless network 100. In various embodiments, the wireless sensors $102_1$-$102_k$ provides raw information such, as but not limited to, distance of objects $101_1$-$101_n$ from wireless sensors $102_1$-$102_k$, speed of objects $101_1$-$101_n$ towards wireless sensors $102_1$-$102_k$. It should be appreciated that wireless system 100 is time division multiplexed.

Wireless network 100 includes, among other things, processing unit 104, switch 103, wireless sensors $102_1$-$102_k$, objects $101_1$-$101_n$, Helmet pads (H-P) $105_1$-$105_i$, and shoulder pads (S-P) $106_1$-$106_j$.

In one embodiment, processing unit 104, switch 103, and wireless sensors $102_1$-$102_k$, are components of wireless system 100 that could reside in Helmet and these components provide activation signal to the Helmet pads $105$-$105_i$ as well as shoulder pads $106$-$106_j$. For example, Helmet pad $105_2$, through wireless system 100, is activated to provide protection. In various embodiments, the pads can be Helmet pads that are attached to Helmet or pads that are attached to shoulder pad.

Processing unit 104 is for processing information received from wireless sensors $102_1$-$102_k$ through switch 103. Processing unit 104 typically utilizes appropriate hardware and software algorithm to properly process the information.

Wireless sensor can be any wireless transceiver that is able to wirelessly transmit communication signals, such as short pulses. Wireless sensor is disposed on any physical platform that is conducive to effectively transmit the signals. For example, is disposed on inner shell of a Helmet. It should be appreciated that many wireless sensors may be disposed on the inner shell.

In various embodiments, all communication to and from the wireless sensor $102_1$-$102_k$ passes through the switch 103.

For example, the switch 103 through processing unit 104 is configured to communicate to one of the wireless sensors $102_1$-$102_k$ only for a specified period of time. For example, processing unit 104 requests information from the wireless sensor $102_1$ by configuring switch 103 to communicate with sensor $102_1$. The request is received by the wireless sensor $102_1$ is in form or an activation signal for an specified period of time. Upon receipt of activation signal, the wireless sensor $102_1$ transmits signals to surrounding objects $101_1$-$101_n$. A portion of transmitted signal reflects from objects $101_1$-$101_n$. The reflected signal from objects $101_1$-$101_n$ are received by wireless sensor $102_1$ and then sent to processing unit 104 through switch 103. In particular the processing unit 104 receives the information (in the form of reflected signal from objects $101_1$-$101_n$) via wireless sensor $102_1$.

In one embodiment, communication through wireless network 100 is selected by switch 103. Switch 103 can be, but is not limited to, a one to k port switch. In general switch 103 at any specified period of time connects processing unit 104 to one of wireless sensors $102_1$-$102_k$. It is commonly used transmitter or receiver between processing unit 104 and wireless sensors $102_1$-$102_k$.

Processing unit 104 has a variety of functions. In general, processing unit 104 is utilized for signal processing, calculation, estimation, activities, methods, procedures, and tools that pertain to the operation, administration, maintenance, and provisioning of wireless sensor network. In one embodiment, processing unit 104 includes a database that is used for various applications. The database can be utilized for analyzing statistics in real-time. Such statistics can be related to number of impacts, severity of impacts, number of Helmet pads and shoulder pads, and any other available statistics.

Processing unit 104 also has a variety of thresholds, such as, but not limited to, distance of object before Helmet pads activation, distance of object before shoulder pads activation, wireless sensor activation time, distance before any impact, pulse signal width, etc. In general, processing unit 104 provides controls to various components that are connected to it. Moreover, processing unit 104 is a high capacity communication facility that connects primary nodes.

In one embodiment, received information from wireless sensor $102_1$-$102_k$ is used in processing unit 104. As such, processing unit 104 will utilize the received information to calculate the distance, speed and direction of object $101_1$-$101_n$. The processing unit 104 then uses the calculated information and various thresholds stored in its data base to activate one of the Helmet pads $105_1$-$105_i$ and/or one of the shoulder pads $106_1$-$106_j$ before an impact occurs.

In one embodiment the processing unit 104 activates one or more of helmet pads $105_1$-$105i$ and shoulder pads $106_1$-$106_j$. Both helmet pads $105_1$-$105_i$ and shoulder pads $106_1$-$106_j$ are inflatable/deflatable pads, pillows and elastic bands to prevent rotational acceleration, by stiffening the movement of the head through stabilization technique just before impact. Both helmet pads $105_1$-$105_i$ and shoulder pads $106_1$-$106_j$ will also act as a shock absorber when at impact, making them reducing the impact as well as rotational acceleration.

In one embodiment the wireless sensors $102_1$-$102_k$ are transceivers that periodically switch between transmission and reception. During transmission a signal is transmitted and during the reception period the reflected transmit signals from the objects $101_1$-$101_n$ are received. The received signal by wireless sensors $102_1$-$102_k$ are then sent to processing unit 104 through switch 103 for further processing.

In one embodiment the wireless sensors $102_1$-$102_k$ are microwave, milimetric wave, or infra-red transceivers. The wireless sensors $102_1$-$102_k$ are connected to the switch 103 via a transmission line.

In one embodiment wireless sensors $102_1$-$102_k$ is controlled by processing unit 104. The processing unit 104 controls transmit pulse width and number of times a pulse is transmitted by wireless sensors $102_1$-$102_k$. Processing unit 104 also coordinates the transmit time and receive time period for the wireless sensors $102_1$-$102_k$.

Figure 2:
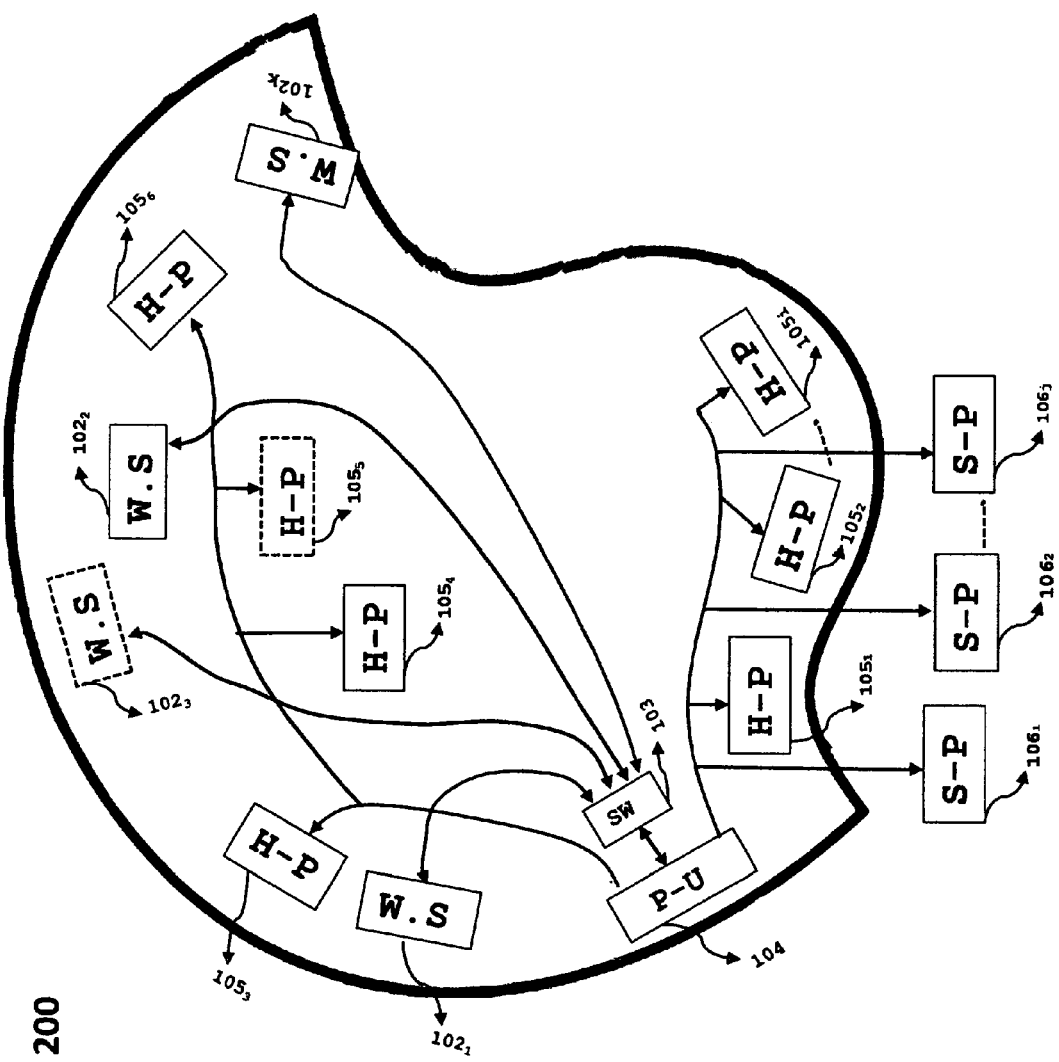
FIG. 2 illustrate embodiments of a helmet with wireless sensing system.

FIG. 2 depicts an embodiment of wireless sensor system on a helmet 200. In one embodiment, helmet 200 comprises of an intelligent wireless sensing system 100 as shown in FIG. 1. In general, helmet 200 is configured for facilitating in the monitoring/detection of possible collision by any object. In particular, helmet 200 is able to process a high volume of data and control various pads to minimize the effect of collision impact. In one embodiment helmet 200 is capable of providing protection that requires for all sort of collision impacts.

In one embodiment, helmet 200 is implemented in-line with wireless sensor system 100. In another embodiment, pluralities of wireless sensors are disposed at various locations in wireless sensor system 100 for facilitating in the monitoring/detection of a possible impact.

Helmet 200 includes processing unit 104, switch 103, wireless sensors $102_1$-$102_k$, helmet pads $105_1$-$105_i$, transmission lines connecting the switch to helmet pads, and interface to shoulder pads $106_1$-$106_j$.

The processing unit 104 on helmet 200 communicates with shoulder pads $106_1$-$106_j$. A physical connection between processing unit 104 and shoulder pads $106_1$-$106_j$ will facilitate this communication.

In one embodiment the wireless sensors $102_1$-$102_k$ are installed at location on helmet to provide most effective information for processing unit 104. Processing unit 104 will use this information to estimate location, speed and direction of objects with high accuracy.

In one embodiment the helmet pads $105_1$-$105_i$ are installed at locations on helmet to, provide the most effective protection from an impact. Processing unit 104 will activate one or more of the helmet pads $105_1$-$105_i$ prior to impact once a potential impact is detected.

In one embodiment the shoulder pads $106_1$-$106_j$ are installed at locations on shoulder pad to provide the most effective protection from an impact. Processing Unit 104 will activate one or more of the shoulder pads $106_1$-$106_j$ prior to impact once a potential impact is detected.

In one embodiment the processing unit 104 will also incorporate the power supply to power all the wireless sensors $102_1$-$102_k$, helmet pads $105_1$-$105_i$ and shoulder pads $106_1$-$106_j$.

Processing unit 104 is configured to receive the pertinent information and to determine whether the helmet is going to experience a possible impact from an external object based at least in part on the pertinent information provided by the wireless sensors $102_1$-$102_k$. For example, processing unit 104 executes an algorithm (e.g., impact determination algorithm) that utilizes the pertinent information to determine whether or not an external object $101_1$-$101_n$ is approaching the helmet 200. In various embodiments, processing unit 104 is a multicore CPU, DSP, or FPGA.

Figure 3:
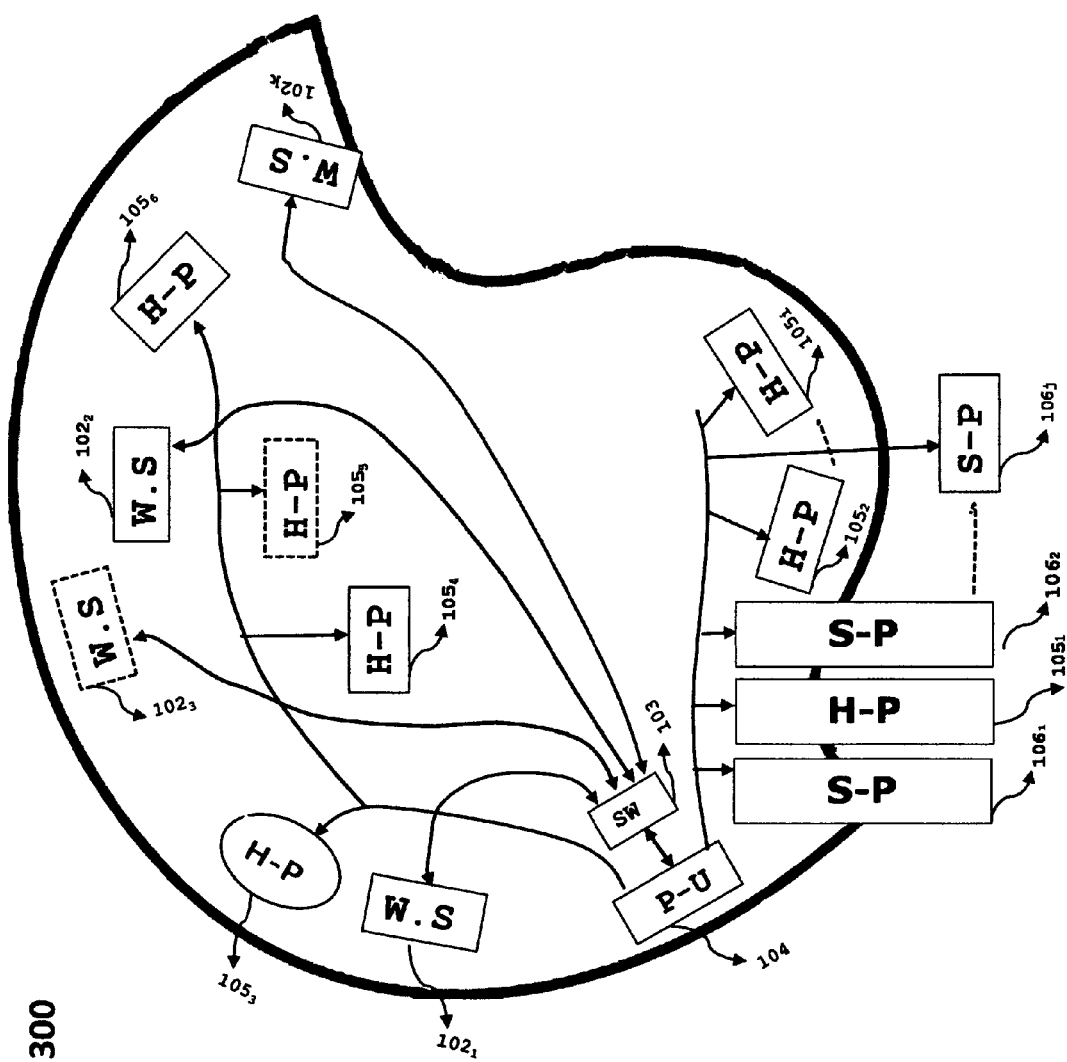
FIG. 3 illustrates embodiments of a method for minimizing protecting the head movement using a wireless sensing system.

FIG. 3 depicts an embodiment of helmet 300. In one embodiment, helmet 300 is similar to helmet 200. For instance, helmet 300 includes hardware processing unit 104, switch 103, wireless sensors $102_1$-$102_k$, and helmet pads $105_1$-$105_i$.

In one embodiment, helmet 300 shows a scenario after an impact from an external object. For example helmet 300 shows activation of some of the helmet pads $105_1$-$105_i$, some of shoulder pads $106_1$-$106_j$.

In one embodiment, helmet 300 shows a scenario after an impact. from an external object. For example helmet 300 shows activation of some of the helmet pads $105_1$-$105_i$. One of the helmet pads 1053 is activated and inflated to absorb the impact force.

In one embodiment, helmet 300 shows a scenario after an impact from an external object. For example helmet 300 shows activation of some of the helmet pads $105_1$-$105_i$. Helmet 300 shows activation of helmet pads $105_1$ to hold head steady and avoid any violent movement of head.

In one embodiment, helmet 300 shows a scenario after an impact from an external object. For example helmet 300 shows activation of some of the shoulder pads $106_1$-$106_j$. Helmet 300 shows activation of helmet pads $106_1$, and $106_2$ to hold head steady and avoid any violent movement of head.

Various embodiments are thus described. While particular embodiments have been described, it should be appreciated that the embodiments should not be construed as limited by such description, but rather construed according to the following claims.

The invention claimed is:

1. A helmet with wireless sensor system for monitoring and detection of impacts to helmet from surrounding objects, said helmet with wireless sensor system comprising:
a number of wireless transceivers to transmit a particular signal and receive reflected transmitted signals from surrounding objects;
a processing unit that uses the information from reflected signal received by wireless transceiver to calculate the speed, distance, and direction of the object to determine when and where an impact will occur;
a number of inflatable/deflatable pads installed on the helmet and external to the helmet that will be activated prior to an impact.

2. The helmet with wireless sensor system of claim 1, wherein said processing unit controls the operation of wireless transceivers through a switch which is between processing unit and transceivers.

3. The helmet with wireless sensor system of claim 1, wherein said processing unit determines when and which pads to activate.

4. The helmet with wireless sensor system of claim 1, wherein said wireless transceiver with integrated antenna functions like radar transceiver that periodically transmit coded pulses and receive the reflected signal.

5. The helmet with wireless sensor system claim 1, wherein said switch between processing unit and wireless transceivers is used by processing unit to select and operate one of the wireless transceivers.

6. The helmet with wireless sensor system of claim 1, wherein said wireless transceivers are microwave, milimetric wave or infra-red transceivers.

7. The helmet with wireless sensor system of claim 1, wherein said helmet pads and external pads are inflatable and deflatable pads.

8. A method to activate the pads of the helmet with wireless sensor system, said method comprising:
received information that was transmitted by the wireless transceiver and reflected from objects;
an algorithm to calculate distance, speed, and direction of an object from received reflected information;
threshold parameters data used to make decision;

an algorithm that uses the threshold parameters and extracted data from received reflected information to determine when and which pads to activate.

9. A helmet with wireless sensor system for monitoring and detection of impacts to helmet from surrounding objects, said helmet with wireless sensor system comprising:
 a wireless transceiver means to transmit and receive signal;
 a pertinent data extracting means for extracting pertinent information from said received reflected information;
 a pertinent decision making means to activate inflatable/deflatable pads prior to any impact;
 an inflating and deflating means to inflate and deflate pads when activated.

10. A helmet with wireless sensor system of claim 9, further comprising:
 an installing means to install pads on the helmet and external to helmet;
 a connection means for connecting external pads to the helmet.

\* \* \* \* \*